United States Patent
McCune et al.

(10) Patent No.: US 10,196,989 B2
(45) Date of Patent: Feb. 5, 2019

(54) GAS TURBINE ENGINE GEAR TRAIN

(71) Applicant: United Technologies Corporation, Farmington, CT (US)

(72) Inventors: Michael E. McCune, Colchester, CT (US); Lawrence E. Portlock, Bethany, CT (US); Frederick M. Schwarz, Glastonbury, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 0 days.

(21) Appl. No.: 15/595,234

(22) Filed: May 15, 2017

(65) Prior Publication Data

US 2017/0248082 A1    Aug. 31, 2017

Related U.S. Application Data (63) Continuation of application No. 13/486,810, filed on Jun. 1, 2012, which is a continuation of application
(Continued)

(51) Int. Cl.
*F02K 3/06* (2006.01)
*F02C 7/36* (2006.01)
(Continued)

(52) U.S. Cl.
CPC .............. *F02C 7/36* (2013.01); *F01D 5/027* (2013.01); *F16H 1/28* (2013.01); *F02C 3/107* (2013.01); *F02K 3/06* (2013.01); *F05D 2220/36* (2013.01); *F05D 2240/70* (2013.01); *F05D 2260/34* (2013.01); *F05D 2260/4031* (2013.01); *F05D 2260/40311* (2013.01);
(Continued)

(58) Field of Classification Search
CPC .................................... F02K 3/06; F02C 7/36
See application file for complete search history.

(56) References Cited

U.S. PATENT DOCUMENTS

| | | |
|---|---|---|
| 2,258,792 A | 4/1941 | New |
| 2,288,792 A | 7/1942 | Daniels |

(Continued)

FOREIGN PATENT DOCUMENTS

| | | |
|---|---|---|
| CN | 1952435 | 4/2007 |
| EP | 0791383 | 8/1997 |

(Continued)

OTHER PUBLICATIONS

Dudley, Darle "Gear Handbook: The Design, Manufacture, and Application of Gears" First Edition, 1962, pp. (3-14)-(3-15).*

(Continued)

*Primary Examiner* — Derek D Knight
(74) *Attorney, Agent, or Firm* — Carlson, Gaskey & Olds, P.C.

(57) ABSTRACT

An epicyclic gear train includes a carrier that supports star gears that mesh with a sun gear. A ring gear surrounds and meshes with the star gears. The star gears are supported on respective journal bearings. Each of the journal bearings includes a peripheral journal surface and each of the star gears includes a radially inner journal surface that is in contact with the peripheral journal surface of the respective journal bearing.

20 Claims, 2 Drawing Sheets

Related U.S. Application Data

No. 13/340,737, filed on Dec. 30, 2011, now Pat. No. 8,858,388, which is a continuation-in-part of application No. 11/504,220, filed on Aug. 15, 2006, now Pat. No. 8,753,243.

(51) Int. Cl.

| | | |
|---|---|---|
| *F01D 5/02* | (2006.01) | |
| *F16H 1/28* | (2006.01) | |
| F16H 57/04 | (2010.01) | |
| F16H 57/08 | (2006.01) | |
| F02C 3/107 | (2006.01) | |

(52) U.S. Cl.
CPC ...... *F16H 57/0423* (2013.01); *F16H 57/0486* (2013.01); *F16H 2057/085* (2013.01)

(56) References Cited

U.S. PATENT DOCUMENTS

| | | |
|---|---|---|
| 2,684,591 A | 7/1954 | Lundquist |
| 2,936,655 A | 5/1960 | Peterson et al. |
| 3,021,731 A | 2/1962 | Stoeckicht |
| 3,160,026 A | 12/1964 | Rosen |
| 3,194,487 A | 7/1965 | Tyler et al. |
| 3,287,906 A | 11/1966 | McCormick |
| 3,352,178 A | 11/1967 | Lindgren et al. |
| 3,412,560 A | 11/1968 | Gaubatz |
| 3,722,323 A | 3/1973 | Welch |
| 3,747,343 A | 7/1973 | Rosen |
| 3,754,484 A | 8/1973 | Roberts |
| 3,820,719 A | 6/1974 | Clark |
| 3,892,358 A | 7/1975 | Gisslen |
| 3,932,058 A | 1/1976 | Harner et al. |
| 3,935,558 A | 1/1976 | Miller et al. |
| 3,988,889 A | 11/1976 | Chamay et al. |
| 4,130,872 A | 12/1978 | Harloff |
| 4,284,174 A | 8/1981 | Salvana et al. |
| 4,478,551 A | 10/1984 | Honeycutt, Jr. et al. |
| 4,583,413 A | 4/1986 | Lack |
| 4,649,114 A | 3/1987 | Miltenburger et al. |
| 4,696,156 A | 9/1987 | Burr et al. |
| 4,979,362 A | 12/1990 | Vershure, Jr. |
| 5,102,379 A | 4/1992 | Pagluica et al. |
| 5,141,400 A | 8/1992 | Murphy et al. |
| 5,211,541 A | 5/1993 | Fledderjohn et al. |
| 5,302,031 A | 4/1994 | Yuasa |
| 5,317,877 A | 6/1994 | Stuart |
| 5,391,125 A | 2/1995 | Turra et al. |
| 5,433,674 A * | 7/1995 | Sheridan .............. F16H 1/2809 475/346 |
| 5,447,411 A | 9/1995 | Curley et al. |
| 5,466,198 A | 11/1995 | McKibben et al. |
| 5,472,383 A | 12/1995 | McKibbin |
| 5,524,847 A | 6/1996 | Brodell et al. |
| 5,677,060 A | 10/1997 | Terentieva et al. |
| 5,778,659 A | 7/1998 | Duesler et al. |
| 5,857,836 A | 1/1999 | Stickler et al. |
| 5,915,917 A | 6/1999 | Eveker et al. |
| 5,975,841 A | 11/1999 | Lindemuth et al. |
| 5,985,470 A | 11/1999 | Spitsberg et al. |
| 6,158,210 A | 12/2000 | Orlando |
| 6,223,616 B1 * | 5/2001 | Sheridan .............. F16H 1/2827 184/6.12 |
| 6,315,815 B1 | 11/2001 | Spadaccini et al. |
| 6,318,070 B1 | 11/2001 | Rey et al. |
| 6,387,456 B1 | 5/2002 | Eaton, Jr. et al. |
| 6,402,654 B1 | 6/2002 | Lanzon et al. |
| 6,517,341 B1 | 2/2003 | Brun et al. |
| 6,530,858 B1 | 3/2003 | Usoro et al. |
| 6,607,165 B1 | 8/2003 | Manteiga et al. |
| 6,669,597 B1 | 12/2003 | Usoro et al. |
| 6,709,492 B1 | 3/2004 | Spadaccini et al. |
| 6,732,502 B2 * | 5/2004 | Seda .............. F01D 5/03 60/226.1 |
| 6,814,541 B2 | 11/2004 | Evans et al. |
| 7,021,042 B2 | 4/2006 | Law |
| 7,328,580 B2 | 2/2008 | Lee et al. |
| 7,374,403 B2 | 5/2008 | Decker et al. |
| 7,591,754 B2 | 9/2009 | Duong et al. |
| 7,662,059 B2 | 2/2010 | McCune |
| 7,704,178 B2 | 4/2010 | Sheridan et al. |
| 7,806,651 B2 | 10/2010 | Kennepohl et al. |
| 7,824,305 B2 | 11/2010 | Duong et al. |
| 7,926,260 B2 | 4/2011 | Sheridan et al. |
| 7,997,868 B1 | 8/2011 | Liang et al. |
| 8,074,440 B2 | 12/2011 | Kohlenberg et al. |
| 8,205,432 B2 | 6/2012 | Sheridan |
| 8,894,538 B2 | 11/2014 | McCune |
| 2002/0064327 A1 | 5/2002 | Toda et al. |
| 2004/0112041 A1 | 6/2004 | Law |
| 2005/0026745 A1 | 2/2005 | Mitrovic |
| 2008/0003096 A1 | 1/2008 | Kohli et al. |
| 2008/0006018 A1 | 1/2008 | Sheridan et al. |
| 2008/0044276 A1 | 2/2008 | McCune et al. |
| 2008/0096714 A1 | 4/2008 | McCune |
| 2008/0116009 A1 | 5/2008 | Sheridan et al. |
| 2008/0317588 A1 | 12/2008 | Grabowski et al. |
| 2009/0053058 A1 | 2/2009 | Kohlenberg et al. |
| 2009/0056306 A1 | 3/2009 | Suciu et al. |
| 2009/0056343 A1 | 3/2009 | Suciu et al. |
| 2009/0081039 A1 | 3/2009 | McCune et al. |
| 2009/0090096 A1 | 4/2009 | Sheridan |
| 2009/0111639 A1 | 4/2009 | Klingels |
| 2009/0293278 A1 | 12/2009 | Duong et al. |
| 2009/0298640 A1 | 12/2009 | Duong et al. |
| 2009/0314881 A1 | 12/2009 | Suciu et al. |
| 2010/0105516 A1 | 4/2010 | Sheridan et al. |
| 2010/0148396 A1 | 6/2010 | Xie et al. |
| 2010/0212281 A1 | 8/2010 | Sheridan |
| 2010/0218483 A1 | 9/2010 | Smith |
| 2010/0331139 A1 | 12/2010 | McCune |
| 2011/0130246 A1 | 6/2011 | McCune |
| 2011/0159797 A1 | 6/2011 | Beltman et al. |
| 2011/0293423 A1 | 12/2011 | Bunker et al. |
| 2012/0124964 A1 | 5/2012 | Hasel et al. |
| 2012/0275904 A1 | 11/2012 | McCune et al. |
| 2013/0023378 A1 | 1/2013 | McCune et al. |
| 2014/0154054 A1 | 6/2014 | Sheridan et al. |
| 2014/0230403 A1 | 8/2014 | Merry et al. |
| 2015/0065285 A1 | 3/2015 | McCune et al. |

FOREIGN PATENT DOCUMENTS

| | | |
|---|---|---|
| EP | 1114949 | 7/2001 |
| EP | 1142850 | 10/2001 |
| EP | 1876338 | 1/2008 |
| EP | 1890054 | 2/2008 |
| EP | 1925855 | 5/2008 |
| EP | 2224100 | 9/2010 |
| EP | 2559913 | 2/2013 |
| EP | 2610463 | 7/2013 |
| FR | 1357038 | 4/1964 |
| GB | 1516041 | 6/1978 |
| GB | 2041090 | 9/1980 |
| GB | 2426792 | 12/2006 |
| JP | 5248267 | 9/1993 |
| JP | 9317833 | 12/1997 |
| JP | 2001208146 | 8/2001 |
| JP | 3920031 | 5/2007 |
| JP | 2015137649 | 7/2015 |
| JP | 2015137649 A | 7/2015 |
| WO | 2007038674 | 4/2007 |
| WO | 20130147951 | 10/2013 |
| WO | 2015017041 | 2/2015 |

OTHER PUBLICATIONS

Notice of Opposition to U.S. Pat. No. 2,610,463. United Technologies Corporation opposed by Safran Aircraft Engines, dated Aug. 3, 2016.
The International Preliminary Report on Patentability for PCT Application No. PCT/US2012/071906, dated Jul. 24, 2014.

(56) References Cited

OTHER PUBLICATIONS

Meier, N (2005). Civil Turbojet/Turbofan Specifications. Retrieved from http://www.jet-engine.net/civtfspec.html.
European Search Report for European Patent Application No. 12198136.9 completed Aug. 21, 2013.
International Search Report and Written Opinion for International Application No. PCT/US2012/071906 completed on Aug. 22, 2013.
Japanese Office Action for Japanese Application No. 2007-202444 dated Aug. 3, 2010.
European Search Report for European Patent Application No. 07253078.5 completed Nov. 22, 2007.
European Search Report for European Patent Application No. 12198045.2 completed Sep. 7, 2015.
Decision Institution of Inter Partes Review. *General Electric Company*, Petitioner, v. *United Technologies Corp.*, Patent Owner. IPR2017-01001. U.S. Pat. No. 8,894,538. Entered Jul. 10, 2017. pp. 1-4.
European Search Report for European Application No. 16183877.6 completed Dec. 23, 2016.
Petition for Inter Partes Review of U.S. Pat. No. 8,894,538. *General Electric Company*, Petitioner, v. *United Technologies Corporation*, Patent Owner. Filed Mar. 1, 2017.
European Search Report for European Application No. 16174068.3 completed Nov. 15, 2016.
Extended European Search Report for European Application No. 16171476.completed Sep. 28, 2016.
Davies, D. and Miller, D.C. (1971). A variable pitch fan for an ultra quiet demonstrator engine. 1976 Spring Convention: Seeds for Success in Civil Aircraft Design in the Next Two Decades. pp. 1-18.
Middleton, P. (1971). 614: VFW's jet feederliner. Flight International, Nov. 4, 1971. p. 725, 729-732.
Schaefer, J.W., Sagerser, D.R., and Stakolich, E.G. (1977). Dynamics of high-bypass-engine thrust reversal using a variable-pitch fan. Technical Report prepare for NASA. NASA-TM-X-3524. May 1, 1977. pp. 1-33.
Savelle, S.A. and Garrard, G.D. (1996). Application of transient and dynamic simulations to the U.S. Army T55-L-712 helicopter engine. The American Society of Mechanical Engineers. Presented Jun. 10-13, 1996. pp. 1-8.
Drago, R.J. and Margasahayam, R.N. (1987). Stress analysis of planet gears with integral bearings; 3D finite-element model development and test validation. 1987 MSC NASTRAN World Users Conference. Los Angeles, CA. Mar. 1987. pp. 1-14.
Baker, R.W. (2000). Membrane technology and applications. New York, NY: McGraw-Hill. pp. 87-153.
Cheryan, M. (1998). Ultrafiltration and microfiltration handbook. Lancaster, PA: Tecnomic Publishing Company, Inc. pp. 171-236.
Seader, J.D. and Henley, E.J. (1998). Separation process principles. New York, NY: John Wiley & Sons, Inc. pp. 722-726 and 764-771.
Spadaccini, L.J., and Huang, H. (2002). On-line fuel deoxygenation for coke suppression. ASME, Jun. 2002. pp. 1-7.
Darrah, S. (1987). Jet fuel deoxygenation. Interim Report for Period Mar. 1987-Jul. 1988. pp. 1-22.
Bucknell, R.L. (1973). Influence of fuels and lubricants on turbine engine design and performance, fuel and lubricant analyses. Final Technical Report, Mar. 1971-Mar. 1973. pp. 1-252.
Hazlett, R.N. (1991). Thermal oxidation stability of aviation turbine fuels. Philadelphia, PA: ASTM. pp. 1-163.
Taylor, W.F. (1974). Deposit formation from deoxygenated hydrocarbons. I. General features. Ind. Eng. Chem., Prod. Res. Develop., vol. 13(2). 1974. pp. 133-138.
Taylor, W.F. (1974). Deposit formation from deoxygenated hydrocarbons. II. Effect of trace sulfur compounds. Ind. Eng. Chem., Prod. Res. Dev., vol. 15(1). 1974. pp. 64-68.
Taylor, W.F. and Frankenfeld, J.W. (1978). Deposit fromation from deoxygenated hydrocarbons. 3. Effects of trace nitrogen and oxygen compounds. Ind. Eng. Chem., Prod. Res. Dev., vol. 17(1). 1978. pp. 86-90.

Frankenfeld, J.W. and Taylor, W.F. (1980). Deposit fromation from deoxygenated hydrocarbons. 4. Studies in pure compound systems. Ind. Eng. Chem., Prod. Res. Dev., vol. 19(1). 1978. pp. 65-70.
Hemighaus, G., Boval, T., Bacha, J., Barnes, F., Franklin, M., Gibbs, L., . . . Morris, J. (2007). Aviation fuels: Techincal review. Chevron Products Company. pp. 1-94. Retrieved from: https://www.cgabusinessdesk.com/document/aviation_tech_review.pdf.
Spadaccini, L.J., Sobel, D.R., and Huang, H. (2001). Deposit formation and mitigation in aircraft fuels. Journal of Eng. For Gas Turbine and Power, vol. 123. Oct. 2001. pp. 741-746.
Edwards, T. and Zabarnick, S. (1993). Supercritical fuel deposition mechanisms. Ind. Eng. Chem. Res. vol. 32. 1993. pp. 3117-3122.
Huang, H., Sobel, D.R., and Spadaccini, L.J. (2002). Endothermic heat-sink of hydrocarbon fuels for scramjet cooling. AIAA/ASME/SAE/ASEE, Jul. 2002. pp. 1-7.
Bessarabov, D.G., Jacobs, E.P., Sanderson, R.D., and Beckman, I.N. (1996). Use of nonporous polymeric flat-sheet gas-separation membranes in a membrane-liquid contactor: experimental studies. Journal of Membrane Sciences, vol. 113. 1996. pp. 275-284.
Matsumoto, T., Toshiro, U., Kishida, A., Tsutomu, F., Maruyama, I., and Akashi, M. (1996). Novel functional polymers: Poly (dimethylsiloxane)-polyamide multiblock copolymer. VII. Oxygen permeability of aramid-silicone membranes in a gas-membrane-liquid system. Journal of Applied Polymer Science, vol. 64(6). May 9, 1997. pp. 1153-1159.
Technical Data. Teflon. WS Hampshire Inc. Retrieved from: http://catalog.wshampshire.com/Asset/psg_teflon_ptfe.pdf.
Anderson, N.E., Loewenthal, S.H., and Black, J.D. (1984). An analytical method to predict efficiency of aircraft gearboxes. NASA Technical Memorandum prepared for the Twentieth Joint Propulsion Conference. Cincinnati, OH. Jun. 11-13, 1984. pp. 1-25.
Edkins, D.P., Hirschkron, R., and Lee, R. (1972). TF34 turbofan quiet engine study. Final Report prepared for NASA. NASA-CR-120914. Jan. 1, 1972. pp. 1-99.
Waters, M.H. and Schairer, E.T. (1977). Analysis of turbofan propulsion system weight and dimensions. NASA Technical Memorandum. Jan. 1977. pp. 1-65.
Meyer, A.G. (1988). Transmission development of TEXTRON Lycoming's geared fan engine. Technical Paper. Oct. 1988. pp. 1-12.
Dudley, D.W., Ed. (1962). Gear handbook. New York, NY: McGraw-Hill. pp. 14-17 (TOC, Preface, and Index).
Hughes, C. (2002). Aerodynamic performance of scale-model turbofan outlet guide vanes designed for low noise. Prepared for the 40th Aerospace Sciences Meeting and Exhibit. Reno, NV. NASA/TM-2001-211352. Jan. 14-17, 2002. pp. 1-38.
Kaplan, B., Nicke, E., Voss, C. (2006), Design of a highly efficient low-noise fan for ultra-high bypass engines. Proceedings of GT2006 for ASME Turbo Expo 2006: Power for Land, Sea and Air. Barcelona, SP. May 8-11, 2006. pp. 1-10.
Gates, D. Bombardier flies at higher market. Seattle Times. Jul. 13, 2008. pp. C6.
Decker, S. and Clough, R. (2016). GE wins shot at voiding pratt patent in jet-engine clash. Bloomberg Technology. Retrieved from: https://www.bloomberg.com/news/articles/2016-06-30/ge-wins-shot-to-invalidate-pratt-airplane-engine-patent-in-u-s.
Trembley, JR., H.F. (1977). Determination of effects of ambient conditions on aircraft engine emissions. ALF 502 combustor rig testing and engine verification test. Prepared for Environmental Protection Agency. Sep. 1977. pp. 1-256.
Lewicki, D.G., Black, J.D., Savage, M., and Coy, J.J. (1985). Fatigue life analysis of a turboprop reduction gearbox. NASA Technical Memorandum. Prepared for the Design Technical Conference (ASME). Sep. 11-13, 1985. pp. 1-26.
McCune, M.E. (1993). Initial test results of 40,000 horsepower fan drive gear system for advanced ducted propulsion systems. AIAA 29th Joint Conference and Exhibit. Jun. 28-30, 1993. pp. 1-10.
Wright, G.H. and Russell, J.G. (1990). The M.45SD-02 variable pitch geared fan engine demonstrator test and evaluation experience. Aeronautical Journal., vol. 84(836). Sep. 1980. pp. 268-277.
Drago, R.J. (1974). Heavy-lift helicopter brings up drive ideas. Power Transmission Design. Mar. 1987. pp. 1-15.

(56) References Cited

OTHER PUBLICATIONS

Krantz, T.L. (1990). Experimental and analytical evaluation of efficiency of helicopter planetary stage. NASA Technical Paper. Nov. 1990. pp. 1-19.

Heingartner, P., MBA, D., Brown, D. (2003). Determining power losses in the helical gear mesh; Case Study. ASME 2003 Design Engineering Technical Conferences. Chicago, IL. Sep. 2-6, 2003. pp. 1-7.

Thulin, R.D., Howe, D.C., and Singer, I.D. (1982). Energy efficient engine: High pressure turbine detailed design report. Prepared for NASA. NASA CR-165608. Received Aug. 9, 1984. pp. 1-178.

Reshotko, M., Karchmer, A., Penko, P.F. (1977). Core noise measurements on a YF-102 turbofan engine. NASA TM X-73587. Prepared for Aerospace Sciences Meeting sponsored by the American Institute of Aeronautics and Astronautics. Jan. 24-26, 2977.

Gray, D.E. (1978). Energy efficient engine preliminary design and integration studies. Prepared for NASA. NASA CR-135396. Nov. 1978. pp. 1-366.

Reynolds, C.N. (1985). Advanced prop-fan engine technology (APET) single- and counter-rotation gearbox/pitch change mechanism. Prepared for NASA. NASA CR-168114 (vol. I). Jul. 1985. pp. 1-295.

McMillian, A. (2008) Material development for fan blade containment casing. Abstract. p. 1. Conference on Engineering and Physics: Synergy for Success 2006. Journal of Physics: Conference Series vol. 105. London, UK. Oct. 5, 2006.

Kurzke, J. (2009). Fundamental differences between conventional and geared turbofans. Proceedings of ASME Turbo Expo: Power for Land, Sea, and Air. 2009, Orlando, Florida. pp. 145-153.

Agarwal, B.D and Broutman, L.J. (1990). Analysis and performance of fiber composites, 2nd Edition. John Wiley & Sons, Inc. New York: New York. pp. 1-30, 50-51, 56-58, 60-61, 64-71, 87-89, 324-329, 436-437.

Carney, K., Pereira, M. Revilock, and Matheny, P. (2003). Jet engine fan blade containment using two alternate geometries. 4th European LS-DYNA Users Conference. pp. 1-10.

Brines, G.L. (1990). The turbofan of tomorrow. Mechanical Engineering: The Journal of the American Society of Mechanical Engineers,108(8), 65-67.

Faghri, A. (1995). Heat pipe and science technology. Washington, D.C.: Taylor & Francis. pp. 1-60.

Hess, C. (1998). Pratt & Whitney develops geared turbofan. Flug Revue 43(7). Oct. 1998.

Grady, J.E., Weir, D.S., Lamoureux, M.C., and Martinez, M.M. (2007). Engine noise research in NASA's quiet aircraft technology project. Papers from the International Symposium on Air Breathing Engines (ISABE). 2007.

Griffiths, B. (2005). Composite fan blade containment case. Modern Machine Shop. Retrieved from: http://www.mmsonline.com/articles/composite-fan-blade-containment-case pp. 1-4.

Hall, C.A. and Crichton, D. (2007). Engine design studies for a silent aircraft. Journal of Turbomachinery, 129, 479-487.

Haque, A. and Shamsuzzoha, M., Hussain, F., and Dean, D. (2003). S20-glass/epoxy polymer nanocomposites: Manufacturing, structures, thermal and mechanical properties. Journal of Composite Materials, 37 (20), 1821-1837.

Brennan, P.J. and Kroliczek, E.J. (1979). Heat pipe design handbook. Prepared for National Aeronautics and Space Administration by B & K Engineering, Inc. Jun. 1979. pp. 1-348.

Horikoshi, S. and Serpone, N. (2013). Introduction to nanoparticles. Microwaves in nanoparticle synthesis. Wiley-VCH Verlag GmbH & Co. KGaA. pp. 1-24.

Kerrebrock, J.L. (1977). Aircraft engines and gas turbines. Cambridge, MA: The MIT Press. p. 11.

Xie, M. (2008). Intelligent engine systems: Smart case system. NASA/CR-2008-215233. pp. 1-31.

Knip, Jr., G. (1987). Analysis of an advanced technology subsonic turbofan incorporating revolutionary materials. NASA Technical Memorandum. May 1987. pp. 1-23.

Willis, W.S. (1979). Quiet clean short-haul experimental engine (QCSEE) final report. NASA/CR-159473 pp. 1-289.

Kojima, Y., Usuki, A. Kawasumi, M., Okada, A., Fukushim, Y., Kurauchi, T., and Kamigaito, O. (1992). Mechanical properties of nylon 6-clay hybrid. Journal of Materials Research, 8(5), 1185-1189.

Kollar, L.P. and Springer, G.S. (2003). Mechanics of composite structures. Cambridge, UK: Cambridge University Press. p. 465.

Ramsden, J.M. (Ed). (1978). The new European airliner. Flight International, 113(3590). Jan. 7, 1978. pp. 39-43.

Langston, L. and Faghri, A. Heat pipe turbine vane cooling. Prepared for Advanced Turbine Systems Annual Program Review. Morgantown, West Virginia. Oct. 17-19, 1995. pp. 3-9.

Oates, G.C. (Ed). (1989). Aircraft propulsion systems and technology and design. Washington, D.C.: American Institute of Aeronautics, Inc. pp. 341-344.

Lau, K., Gu, C., and Hui, D. (2005). A critical review on nanotube and nanotube/nanoclay related polymer composite materials. Composites: Part B 37(2006) 425-436.

Shorter Oxford English dictionary, 6th Edition. (2007). vol. 2, N-Z. p. 1888.

Lynwander, P. (1983). Gear drive systems: Design and application. New York, New York: Marcel Dekker, Inc. pp. 145, 355-358.

Sweetman, B. and Sutton, O. (1998). Pratt & Whitney's surprise leap. Interavia Business & Technology, 53.621, p. 25.

Mattingly, J.D. (1996). Elements of gas turbine propulsion. New York, New York: McGraw-Hill, Inc. pp. 8-15.

Pyrograf-III Carbon Nanofiber. Product guide. Retrieved Dec. 1, 2015 from: http://pyrografproducts.com/Merchant5/merchant.mvc?Screen=cp_nanofiber.

Nanocor Technical Data for Epoxy Nanocomposites using Nanomer 1.30E Nanoclay. Nnacor, Inc. Oct. 2004.

Ratna, D. (2009). Handbook of thermoset resins. Shawbury, UK: iSmithers. pp. 187-216.

Wendus, B.E., Stark, D.F., Holler, R.P., and Funkhouser, M.E. (2003). Follow-on technology requirement study for advanced subsonic transport. NASA/CR-2003-212467. pp. 1-37.

Silverstein, C.C., Gottschlich, J.M., and Meininger, M. The feasibility of heat pipe turbine vane cooling. Presented at the International Gas Turbine and Aeroengine Congress and Exposition, The Hague, Netherlands. Jun. 13-16, 1994.pp. 1-7.

Merriam-Webster's collegiate dictionary, 11th Ed. (2009). p. 824.

Merriam-Webster's collegiate dictionary, 10th Ed. (2001). p. 1125-1126.

Whitaker, R. (1982). ALF 502: plugging the turbofan gap. Flight International, p. 237-241, Jan. 30, 1982.

Hughes, C. (2010). Geared turbofan technology. NASA Environmentally Responsible Aviation Project. Green Aviation Summit. NASA Ames Research Center. Sep. 8-9, 2010. pp. 1-8.

Gliebe, P.R. and Janardan, B.A. (2003). Ultra-high bypass engine aeroacoustic study. NASA/CR-2003-21252. GE Aircraft Engines, Cincinnati, Ohio. Oct. 2003. pp. 1-103.

Moxon, J. How to save fuel in tomorrow's engines. Flight International. Jul. 30, 1983. 3873(124). pp. 272-273.

File History for U.S. Appl. No. 12/131,876.

Cusick, M. (1981). Avco Lycoming's ALF 502 high bypass fan engine. Society of Automotive Engineers, inc. Business Aircraft Meeting & Exposition. Wichita, Kansas. Apr. 7-10, 1981. pp. 1-9.

Fledderjohn, K.R. (1983). The TFE731-5: Evolution of a decade of business jet service. SAE Technical Paper Series. Business Aircraft Meeting & Exposition. Wichita, Kansas. Apr. 12-15, 1983. pp. 1-12.

Dickey, T.A. and Dobak, E.R. (1972). The evolution and development status of ALF 502 turbofan engine. National Aerospace Engineering and Manufacturing Meeting. San Diego, California. Oct. 2-5, 1972. pp. 1-12.

Gunston, B. (Ed.) (2000). Jane's aero-engines, Issue seven. Coulsdon, Surrey, UK: Jane's Information Group Limited. pp. 510-512.

Ivchenko-Progress D-436. Jane's Aero-engines, Aero-engines—Turbofan. Feb. 8, 2012.

Ivchenko-Progress AI-727M. Jane's Aero-engines, Aero-engines—Turbofan. Nov. 27, 2011.

Ivchenko-Progress D-727. Jane's Aero-engines, Aero-engines—Turbofan. Feb. 7, 2007.

Turbomeca Aubisque. Jane's Aero-engines, Aero-engines—Turbofan. Nov. 2, 2009.

(56) References Cited

OTHER PUBLICATIONS

Aviadvigatel D-110. Jane's Aero-engines, Aero-engines—Turbofan. Jun. 1, 2010.
Rolls-Royce M45H. Jane's Aero-engines, Aero-engines—Turbofan. Feb. 24, 2010.
Honeywell LF502. Jane's Aero-engines, Aero-engines—Turbofan. Feb. 9, 2012.
Honeywell LF507. Jane's Aero-engines, Aero-engines—Turbofan. Feb. 9, 2012.
Honeywell TFE731. Jane's Aero-engines, Aero-engines—Turbofan. Jul. 18, 2012.
NASA Conference Publication. Quiet, powered-lift propulsion. Cleveland, Ohio. Nov. 14-15, 1978. pp. 1-420.
"Civil Turbojet/Turbofan Specifications", Jet Engine Specification Database (Apr. 3, 2005).
Kandebo, S.W. (1993). Geared-turbofan engine design targets cost, complexity. Aviation Week & Space Technology, 148(8). Start p. 32.
Hendricks, E.S. and Tong, M.T. (2012). Performance and weight estimates for an advanced open rotor engine. NASA/TM-2012-217710. pp. 1-13.
Guynn, M. D., Berton, J.J., Fisher, K. L., Haller, W.J., Tong, M. T., and Thurman, D.R. (2011). Refined exploration of turbofan design options for an advanced single-aisle transport. NASA/TM-2011-216883. pp. 1-27.
Zalud, T. (1998). Gears put a new spin on turbofan performance. Machine Design, 70(20), p. 104.
Kurzke, J. (2008). Preliminary Design, Aero-engine design: From state of the art turbofans towards innovative architectures. pp. 1-72.
Zamboni, G. and Xu, L. (2009). Fan root aerodynamics for large bypass gas turbine engines: Influence on the engine performance and 3D design. Proceedings of ASME Turbo Expo 2009: Power for Land, Sea and Air. Jun. 8-12, 2009, Orlando, Florida, USA. pp. 1-12.
Han, J., Dutta, S., and Ekkad, S.V. (2000). Gas turbine heat transfer and cooling technology. New York, NY: Taylor & Francis. pp. 1-25, 129-157, and 160-249.
Mattingly, J.D. (1996). Elements of gas turbine propulsion. New York, New York: McGraw-Hill, Inc. pp. 1-18, 30-62, 85-87, 95-104, 121-123, 223-234, 242-245, 278-280, 303-309, 323-326, 462-479, 517-520, 563-565, 673-675, 382-685, 697-699, 703-705, 802-805, 862-864, and 923-925.
Declaration of Reza Abhari, Ph.D. In re U.S. Pat. No. 8,844,265. Executed Jun. 28, 2016. pp. 1-91.
Declaration of John Eaton, Ph.D. In re U.S. Pat. No. 8,869,568. Executed Mar. 28, 2016. pp. 1-87.
Declaration of Reza Abhari. In re U.S. Pat. No. 8,695,920. Executed Nov. 30. pp. 1-67.
Declaration of Reza Abhari. In re U.S. Pat. No. 8,448,895. Executed Nov. 28. pp. 1-81.
Declaration of Reza Abhari. In re U.S. Pat. No. 8,695,920, claims 1-4, 7-14, 17 and 19. Executed Nov. 29. pp. 1-102.
Declaration of Dr. Magdy Attia. In re U.S. Pat. No. 8,313,280. Executed Oct. 21, 2016. pp. 1-88.
Lord, W.K., MacMartin, D.G., and Tillman, T.G. (2000). Flow control opportunities in gas turbine engines. American Institute of Aeronautics and Astronautics. pp. 1-15.
Daly, M. Ed. (2010). Jane's Aero-Engine. Issue Twenty-seven. Mar. 2010. p. 633-636.
Roux, E. (2007). Turbofan and turbojet engines database handbook. Editions Elodie Roux. Blagnac: France. pp. 1-595.
Wilfert, G. (2008). Geared fan. Aero-Engine Design: From State of the Art Turbofans Towards Innovative Architectures, von Karman Institute for Fluid Dynamics, Belgium, Mar. 3-7, 2008. pp. 1-26.
Declaration of Dr. Magdy Attia. In re U.S. Pat. No. 8,517,668. Executed Dec. 8, 2016. pp. 1-81.
Cramoisi, G. Ed. (2012). Death in the Potomac: The crash of Air Florida Flight 90. Air Crash Investigations. Accident Report NTSB/AAR-82-8. p. 45-47.

Norton, M. and Karczub, D. (2003). Fundamentals of noise and vibration analysis for engineers. Press Syndicate of the University of Cambridge. New York: New York. p. 524.
U.S. Department of Transportation: Federal Aviation Administration Advisory Circular. Runway overrun prevention. Dated: Nov. 6, 2007. p. 1-8 and Appendix 1 p. 1-15, Appendix 2 p. 1-6, Appendix 3 p. 1-3, and Appendix 4 p. 1-5.
U.S. Department of Transportation: Federal Aviation Administration Advisory Circular. Standard operating procedures for flight deck crewmembers. Dated: Feb. 27, 2003.. p. 1-6 and Appendices.
Vasudevan, A.K. and Petrovic, J.J. (1992). A comparative overview of molybedenum disilicide composites. Materials Science and Engineering, A155, 1992. pp. 1-17.
Clarke, D.R. and Levi, C.G. (2003). Materials design for the next generation thermal barrier coatings. Annual. Rev. Mater. Res. vol. 33. 2003. pp. 383-417.
Lee, K.N. (2000). Current status of environmental barrier coatings for Si-Based ceramics. Surface and Coatings Technology 133-134, 2000. pp. 1-7.
Bornstein, N. (1993). Oxidation of advanced intermetallic compounds. Journal de Physique IV, 1993, 03 (C9), pp. C9-367-C9-373.
Krenkel, W., Naslain, R., and Schneider, H. Eds. (2001). High temperature ceramic matrix composites pp. 224-229. Weinheim, DE: Wiley-VCH Verlag GmbH.
Gibala, R., Ghosh, A.K., Van Aken, D.C., Srolovitz, D.J., Basu, A., Chang, H., . . . Yang, W. (1992). Mechanical behavior and interface design of MoSi2-based alloys and composites. Materials Science and Engineering, A155, 1992. pp. 147-158.
Shah, D.M. (1992). MoSi2 and other silicides as high temperature structural materials. Superalloys 1992. The Minerals, Metals, & Materials Society. pp. 409-422.
Zhao, J.C. and Westbrook, J.H. (2003). Uttrahigh-temperature materials for jet engines. MRS Bulletin. vol. 28(9). Sep. 2003. pp. 622-630.
Tsirlin, M., Pronin, Y.E., Florina, E.K., Mukhametov, S. Kh., Khatsernov, M.A., Yun, H.M., . . . Kroke, E. (2001). Experimental investigation of multifunctional interphase coatings on SiC fibers for non-oxide high temperature resistant CMCs. High Temperature Ceramic Matrix Composites. 4th Int'l Conf. on High Temp. Ceramic Matrix Composites. Oct. 1-3, 2001. pp. 149-156.
Jacobson, N.S. (1993). Corrosion of silicon-based ceramics in combustion environments. J. Am. Ceram. Soc. 76(1). pp. 3-28.
Jorgensen, P.J., Wadsworth, M.E., and Cutler, I.B. (1961). Effects of water vapor on oxidation of silicon carbide. J. Am. Ceram. Soc. 44(6). pp. 248-261.
Xu, Y., Cheng, L., Zhang, L., Ying, H., and Zhou, W. (1999). Oxidation behavior and mechanical properties of C/SiC composites with Si-MoSi2 oxidation protection coating. J. of Mat. Sci. vol. 34. 1999. pp. 6009-6014.
Sundaram, S.K., Hsu, J-Y., Speyer, R.F. (1995). Molten glass corrosion resistance of immersed combustion-heating tube materials in e-glass. J. Am. Ceram. Soc. 78(7). pp. 1940-1946.
Jeng, Y.-L., Lavernia, E.J. (1994). Processing of molybdenum disilicide. J. of Mat. Sci. vol. 29. 1994. pp. 2557-2571.
Suzuki, Y., Morgan, P.E.D., and Niihara, K. (1998). Improvement in mechanical properties of powder-processed MoSi2 by the addition of Sc2O3 and Y2O3. J. Am. Ceram. Soci. 81(12). pp. 3141-3149.
Webster, J.D., Westwood, M.E., Hayes, F.H., Day, R.J., Taylor, R., Duran, A., . . . Vogel, W.D. (1998). Oxidation protection coatings for C/SiC based on yttrium silicate. Journal of European Ceramic Society vol. 18. 1998. pp. 2345-2350.
Petrovic, J.J., Castro, R.G., Vaidya, R.U., Peters, M.I., Mendoza, D., Hoover, R.C., and Gallegos, D.E. (2001). Molybdenum disilicide materials for glass melting sensor sheaths. Ceramic Engineering and Science Proceedings. vol. 22(3). 2001. pp. 59-64.
Kahn, H., Tayebi, N., Ballarini, R., Mullen, R.L., Heuer, A.H. (2000). Fracture toughness of polysilicon MEMS devices. Sensors and Actuators vol. 82. 2000. pp. 274-280.
Muhlstein, C.L., Stach, E.A., and Ritchie, R.O. (2002). A reaction-layer mechanism for the delayed failure of micron-scale polycrystalline silicon structural films subjected to high-cycle fatigue loading. Acta Materialia vol. 50. 2002. pp. 3579-3595.

(56) References Cited

OTHER PUBLICATIONS

Sundaram, S.K., Hsu, J-Y., Speyer, R.F. (1994). Molten glass corrosion resistance of immersed combustion-heating tube materials in soda-lime-silicate glass. J. Am. Ceram. Soc. 77(6). pp. 1613-1623.

Leckie, F.A. and Dal Bello, D.J. (2009). Strength and stiffness of engineering systems. Mechanical Engineering Series. Springer. pp. 1-3.

El-Sayad, A.F. (2008). Aircraft propulsion and gas turbine engines. Boca Raton, FL: CRC Press. pp. 215-219 and 855-860.

Bunker, R.S. (2005). A review of shaped hole turbine film-cooling technology. Journal of Heat Transfer vol. 127. Apr. 2005. pp. 441-453.

\* cited by examiner

FIG.1

GAS TURBINE ENGINE GEAR TRAIN

CROSS REFERENCE TO RELATED APPLICATIONS

The present disclosure is a continuation application of U.S. patent application Ser. No. 13/486,810, filed Jun. 1, 2012, which is a continuation application of U.S. patent application Ser. No. 13/340,737, filed on Dec. 30, 2011, which is a continuation-in-part of U.S. patent application Ser. No. 11/504,220, filed Aug. 15, 2006.

BACKGROUND OF THE INVENTION

This invention relates to a ring gear used in an epicyclic gear train of a gas turbine engine.

Gas turbine engines typically employ an epicyclic gear train connected to the turbine section of the engine, which is used to drive the turbo fan. In a typical epicyclic gear train, a sun gear receives rotational input from a turbine shaft through a compressor shaft. A carrier supports intermediate gears that surround and mesh with the sun gear. A ring gear surrounds and meshes with the intermediate gears. In arrangements in which the carrier is fixed against rotation, the intermediate gears are referred to as "star" gears and the ring gear is coupled to an output shaft that supports the turbo fan.

Typically, the ring gear is connected to the turbo fan shaft using a spline ring. The spline ring is secured to a flange of the turbo fan shaft using circumferentially arranged bolts. The spline ring includes splines opposite the flange that supports a splined outer circumferential surface of the ring gear. The ring gear typically includes first and second portions that provide teeth facing in opposite directions, which mesh with complimentary oppositely facing teeth of the star gears.

An epicyclic gear train must share the load between the gears within the system. As a result, the splined connection between the ring gear and spline ring is subject to wear under high loads and deflection. Since the spline connection requires radial clearance, it is difficult to get a repeatable balance of the turbo fan assembly. Balance can also deteriorate over time with spline wear.

SUMMARY

A disclosed example gear apparatus according to a non-limiting exemplary embodiment includes an epicyclic gear train including a carrier supporting star gears that mesh with a sun gear, and a ring gear surrounding and meshing with the star gears, the star gears being supported on respective journal bearings. Each of the journal bearings including a peripheral journal surface and each of the star gears including a radially inner journal surface in contact with the peripheral journal surface of the respective journal bearing.

In a further embodiment of the foregoing gear apparatus, the radially inner journal surface of each of the star gears is in contact with the peripheral journal surface of the respective journal bearing along an axial length with respect to a rotational axis of the respective star gear.

In a further embodiment of the foregoing gear apparatus, the radially inner journal surface of each of the star gears is in contact with the peripheral journal surface of the respective journal bearing along a substantially full axial length of the respective star gear with respect to a rotational axis of the respective star gear.

In a further embodiment of the foregoing gear apparatus, the epicyclic gear train has a gear reduction ratio of greater than or equal to 2.3.

In a further embodiment of the foregoing gear apparatus, the epicyclic gear train has a gear reduction ratio of greater than or equal to about 2.5.

In a further embodiment of the foregoing gear apparatus, the epicyclic gear train has a gear reduction ratio of greater than or equal to 2.5.

A disclosed turbine engine according to another non-limiting exemplary embodiment includes a turbine shaft, a fan, and an epicyclic gear train coupled between the turbine shaft and the fan, the epicyclic gear train including a carrier supporting star gears that mesh with a sun gear, and a ring gear surrounding and meshing with the star gears. Each of the star gears is supported on a respective journal bearing and each journal bearing includes a peripheral journal surface and each of the star gears includes a radially inner journal surface in contact with the peripheral journal surface of the respective journal bearing.

In a further embodiment of the foregoing turbine engine, the radially inner journal surface of each of the star gears is in contact with the peripheral journal surface of the respective journal bearing along an axial length with respect to a rotational axis of the respective star gear.

In a further embodiment of the foregoing turbine engine the radially inner journal surface of each of the star gears is in contact with the peripheral journal surface of the respective journal bearing along a substantially full axial length of the respective star gear with respect to a rotational axis of the respective star gear.

In a further embodiment of the foregoing turbine engine, the epicyclic gear train has a gear reduction ratio of greater than or equal to 2.3.

In a further embodiment of the foregoing turbine engine, the epicyclic gear train has a gear reduction ratio of greater than or equal to about 2.5.

In a further embodiment of the foregoing turbine engine, the epicyclic gear train has a gear reduction ratio of greater than or equal to 2.5.

In a further embodiment of the foregoing turbine engine the fan defines a bypass ratio of greater than about ten (10) with regard to a bypass airflow and a core airflow.

In a further embodiment of the foregoing turbine engine, the fan defines a bypass ratio of greater than about 10.5:1 with regard to a bypass airflow and a core airflow.

In a further embodiment of the foregoing turbine engine, the fan defines a bypass ratio of greater than ten (10) with regard to a bypass airflow and a core airflow.

In a further embodiment of the foregoing turbine engine, the fan defines a pressure ratio that is less than about 1.45.

In a further embodiment of the foregoing turbine engine, the fan defines a pressure ratio that is that is less than 1.45.

Although different examples have the specific components shown in the illustrations, embodiments of this invention are not limited to those particular combinations. It is possible to use some of the components or features from one of the examples in combination with features or components of another of the examples.

These and other features disclosed herein can be best understood from the following specification and drawings, the following of which is a brief description.

DETAILED DESCRIPTION

Figure 1:
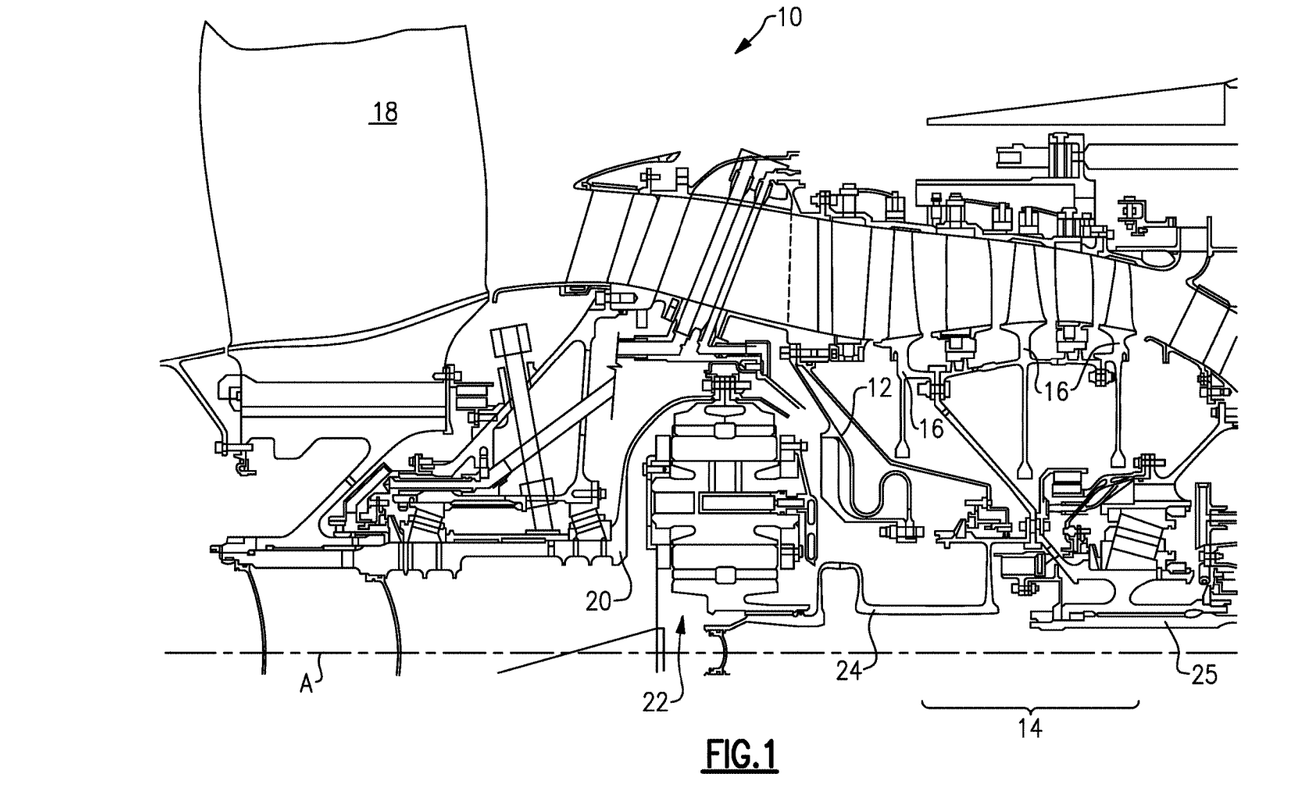
FIG. 1 is a partial cross-sectional view of a front portion of a gas turbine engine illustrating a turbo fan, epicyclic gear train and a compressor section.

A portion of a gas turbine engine 10 is shown schematically in FIG. 1. The turbine engine 10 includes a fixed housing 12 that is constructed from numerous pieces secured to one another. A compressor section 14 having compressor hubs 16 with blades are driven by a turbine shaft 25 about an axis A. A turbo fan 18 is supported on a turbo fan shaft 20 that is driven by a compressor shaft 24, which supports the compressor hubs 16, through an epicyclic gear train 22.

Figures 2, 3, 4:
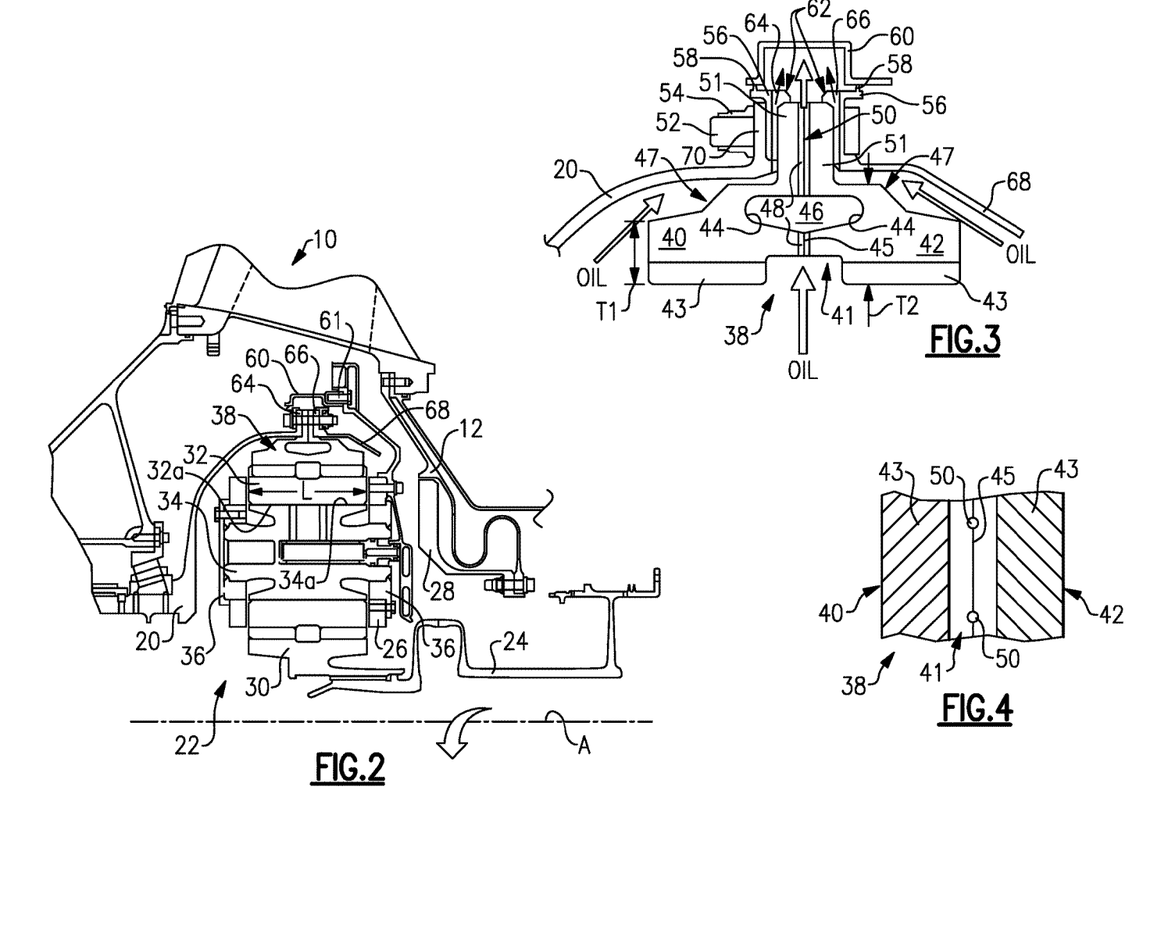
FIG. 2 is an enlarged cross-sectional view of the epicyclic gear train shown in FIG. 1.
FIG. 3 is an enlarged cross-sectional view of an example ring gear similar to the arrangement shown in FIG. 2.
FIG. 4 is a view of the ring gear shown in FIG. 3 viewed in a direction that faces the teeth of the ring gear in FIG. 3.

In the example arrangement shown, the epicyclic gear train 22 is a star gear train. Referring to FIG. 2, the epicyclic gear train 22 includes a sun gear 30 that is connected to the compressor shaft 24, which provides rotational input, by a splined connection. A carrier 26 is fixed to the housing 12 by a torque frame 28 using fingers (not shown) known in the art. The carrier 26 supports star gears 32 using journal bearings 34 that are coupled to the sun gear 30 by meshed interfaces between the teeth of sun and star gears 30, 32. Multiple star gears 32 are arranged circumferentially about the sun gear 30. Retainers 36 retain the journal bearings 34 to the carrier 26. A ring gear 38 surrounds the carrier 26 and is coupled to the star gears 32 by meshed interfaces. The ring gear 38, which provides rotational output, is secured to the turbo fan shaft 20 by circumferentially arranged fastening elements, which are described in more detail below.

The star gears 32 are supported on respective ones of the journal bearings 34, Each of the journal bearings 34 includes a peripheral journal surface 34a and each of the star gears 32 includes a radially inner journal surface 32a that is in contact with the peripheral journal surface 34a of the respective journal bearing 34. The radially inner journal surface 32a of each of the star gears 32 is in contact with the peripheral journal surface 34a of the respective journal bearing 34 along an axial length L, with respect to a rotational axis of the respective star gear 32, which is substantially parallel to the axis A. In this example, the radially inner journal surface 32a of each of the star gears 32 is in contact with the peripheral journal surface 34a of the respective journal bearing 34 along a substantially full axial length L of the respective star gear 32. Thus, the journal bearings 34 provide a "line" contact. In comparison, a ball bearing would provide a "point" contact. The "line" contact between the journal bearings 34 and the star gears 32 distributes loads on the journal bearings 34, rather than focusing the load at a single point, and thereby enhances the durability of the epicyclic gear train 22.

In one disclosed, non-limiting embodiment, the engine 10 has a bypass ratio that is greater than about six (6) to ten (10), the epicyclic gear train 22 is a planetary gear system or other gear system with a gear reduction ratio of greater than about 2.3 or greater than about 2.5, and a low pressure turbine of the engine 10 has a pressure ratio that is greater than about 5. In one disclosed embodiment, the engine 10 bypass ratio is greater than about ten (10:1) or greater than about 10.5:1, the turbofan 18 diameter is significantly larger than that of the low pressure compressor of the compressor section 14, and the low pressure turbine has a pressure ratio that is greater than about 5:1. In one example, the epicyclic gear train 22 has a gear reduction ratio of greater than about 2.3:1 or greater than about 2.5:1. It should be understood, however, that the above parameters are only exemplary of one embodiment of a geared architecture engine and that the present invention is applicable to other gas turbine engines including direct drive turbofans.

A significant amount of thrust is provided by a bypass flow B due to the high bypass ratio. The fan 18 of the engine 10 is designed for a particular flight condition—typically cruise at about 0.8 M and about 35,000 feet. The flight condition of 0.8 M and 35,000 ft, with the engine at its best fuel consumption—also known as "bucket cruise TSFC"—is the industry standard parameter of lbm of fuel being burned divided by lbf of thrust the engine produces at that minimum point. "Low fan pressure ratio" is the pressure ratio across the fan blade alone. The low fan pressure ratio as disclosed herein according to one non-limiting embodiment is less than about 1.45. "Low corrected fan tip speed" is the actual fan tip speed in ft/sec divided by an industry standard temperature correction of [(Tambient deg R)/518.7) ^0.5]. The "Low corrected fan tip speed" as disclosed herein according to one non-limiting embodiment is less than about 1150 ft/second.

Referring to FIGS. 3 and 4, the ring gear 38 is a two-piece construction having first and second portions 40, 42. The first and second portions 40, 42 abut one another at a radial interface 45. A trough 41 separates oppositely angled teeth 43 (best shown in FIG. 4) on each of the first and second portions 40, 42. The arrangement of teeth 43 forces the first and second portions 40, 42 toward one another at the radial interface 45. The back side of the first and second portions 40, 42 includes a generally S-shaped outer circumferential surface 47 that, coupled with a change in thickness, provides structural rigidity and resistance to overturning moments. The first and second portions 40, 42 have a first thickness T1 that is less than a second thickness T2 arranged axially inwardly from the first thickness T1. The first and second portions 40, 42 include facing recesses 44 that form an internal annular cavity 46.

The first and second portions 40, 42 include flanges 51 that extend radially outward away from the teeth 43. The turbo fan shaft 20 includes a radially outwardly extending flange 70 that is secured to the flanges 51 by circumferentially arranged bolts 52 and nuts 54, which axially constrain and affix the turbo fan shaft 20 and ring gear 38 relative to one another. Thus, the spline ring is eliminated, which also reduces heat generated from windage and churning that resulted from the sharp edges and surface area of the splines. The turbo fan shaft 20 and ring gear 38 can be rotationally balanced with one another since radial movement resulting from the use of splines is eliminated. An oil baffle 68 is also secured to the flanges 51, 70 and balanced with the assembly.

Seals 56 having knife edges 58 are secured to the flanges 51, 70. The first and second portions 40, 42 have grooves 48 at the radial interface 45 that form a hole 50, which expels oil through the ring gear 38 to a gutter 60 that is secured to the carrier 26 with fasteners 61 (FIG. 2). The direct radial flow path provided by the grooves 48 reduces windage and churning by avoiding the axial flow path change that existed with splines. That is, the oil had to flow radially and then axially to exit through the spline interface. The gutter 60 is constructed from a soft material such as aluminum so that the knife edges 58, which are constructed from steel, can cut into the aluminum if they interfere. Referring to FIG. 3, the seals 56 also include oil return passages 62 provided by first and second slots 64 in the seals 56, which permit oil on either side of the ring gear 38 to drain into the gutter 60. In the example shown in FIG. 2, the first and second slots 64, 66 are instead provided in the flange 70 and oil baffle 68, respectively.

Although an embodiment of this invention has been disclosed, a worker of ordinary skill in this art would recognize that certain modifications would come within the scope of this invention. For that reason, the following claims should be studied to determine the true scope and content of this invention.

What is claimed is:

1. A turbine engine comprising:
an input shaft;
a fan mounted on a fan shaft; and
an epicyclic gear train coupled between the input shaft and the fan shaft, the epicyclic gear train including a carrier, intermediate gears, a sun gear, a ring gear, and journal bearings, the carrier supporting the intermediate gears on the journal bearings, the intermediate gears meshing with the sun gear and the ring gear surrounding and meshing with the intermediate gears, the ring gear including,
first and second portions that abut at a radial interface, the first and second portions having respective flanges that abut at the radial interface,
each of the first and second portions having a first thickness and a second thickness that is located axially inwardly from the first thickness, the first thickness being less than the second thickness, and the flanges extending radially outwards from a location at the respective second thickness.

2. The turbine engine as recited in claim 1, wherein the radially inner journal surface of each of the star gears is in contact with the peripheral journal surface of the respective journal bearing along an axial length with respect to a rotational axis of the respective star gear.

3. The turbine engine as recited in claim 1, wherein the radially inner journal surface of each of the star gears is in contact with the peripheral journal surface of the respective journal bearing along a substantially full axial length of the respective star gear with respect to a rotational axis of the respective star gear.

4. The turbine engine as recited in claim 3, wherein the epicyclic gear train has a gear reduction ratio of greater than or equal to about 2.5.

5. The turbine engine as recited in claim 1, wherein the fan defines a bypass ratio of greater than about 10.5:1 with regard to a bypass airflow and a core airflow.

6. The turbine engine as recited in claim 5, wherein the fan defines a pressure ratio that is that is less than 1.45.

7. The turbine engine as recited in claim 1, wherein the first portion has first angled teeth and the second portion has second, oppositely angled teeth, and the ring gear includes a trough axially between the first and second angled teeth.

8. The turbine engine as recited in claim 7, wherein the first and second portions include oppositely axially facing recesses that together form an annular cavity at the radial interface.

9. The turbine engine as recited in claim 8, wherein radially outer sides of the first and second portions each have a generally S-shaped surface.

10. The turbine engine as recited in claim 1, wherein the fan shaft includes a fan shaft flange that extends radially and is secured in a joint to the flanges of the ring gear.

11. The turbine engine as recited in claim 10, wherein the fan shaft flange is secured in the joint to the flanges of the ring gear by fasteners that axially constrain the fan shaft and the ring gear relative to one another.

12. The turbine engine as recited in claim 11, further comprising an oil baffle secured in the joint by the fasteners.

13. The turbine engine as recited in claim 12, wherein the fan shaft flange and the oil baffle include first and second oil return passages that open on one end thereof to a region radially outwards of the flanges of the ring gear and on another end thereof to respective forward and aft sides of the ring gear with respect to an engine longitudinal axis.

14. The turbine engine as recited in claim 13, further comprising first and second seals secured in the joint by the fasteners, the first and second seals having respective radially outwardly facing knife edges.

15. The turbine engine as recited in claim 12, further comprising first and second seals secured in the joint by the fasteners, the first and second seals having respective radially outwardly facing knife edges.

16. The turbine engine as recited in claim 15, wherein the first and second portions have grooves at the radial interface that form an oil hole, the oil hole opening to radially outer ends of the flanges of the ring gear.

17. The turbine engine as recited in claim 16, further comprising a gutter radially outwards from the flanges of the ring gear and secured to the carrier, and the gutter defining an interior region for oil collection.

18. The turbine engine as recited in claim 17, wherein the knife edges abut the gutter.

19. The turbine engine as recited in claim 18, wherein the first and second seals include, respectively, first and second oil return passages that open on one end thereof to the interior region and on another end thereof to respective forward and aft sides of the ring gear, and the oil hole opening to the region.

20. The turbine engine as recited in claim 19, wherein the first and second portions include oppositely axially facing recesses that together form an annular cavity at the radial interface, and the oil hole opening to the annular cavity, the first portion has first angled teeth and the second portion has second, oppositely angled teeth, and the ring gear includes a trough axially between the first and second angled teeth, and the oil hole continues radially inwards of the annular cavity and opens to the trough.

* * * * *

UNITED STATES PATENT AND TRADEMARK OFFICE
CERTIFICATE OF CORRECTION

PATENT NO. : 10,196,989 B2
APPLICATION NO. : 15/595234
DATED : February 5, 2019
INVENTOR(S) : Michael E. McCune, Lawrence E. Portlock and Frederick M. Schwarz Page 1 of 1

It is certified that error appears in the above-identified patent and that said Letters Patent is hereby corrected as shown below:

In the Claims

In Claim 1, Column 5, Line 23; replace "including," with -- including: --

In Claim 6, Column 5, Line 51; delete second instance of "that is"

Signed and Sealed this
Seventeenth Day of September, 2019

Andrei Iancu
*Director of the United States Patent and Trademark Office*